United States Patent [19]

Onishi

[11] Patent Number: 5,194,028
[45] Date of Patent: Mar. 16, 1993

[54] CATHODE RAY TUBE POSITIONING DEVICE

[75] Inventor: Kikuichi Onishi, Aichi, Japan

[73] Assignee: Sony Corporation, Tokyo, Japan

[21] Appl. No.: 872,122

[22] Filed: Apr. 22, 1992

[30] Foreign Application Priority Data

Apr. 23, 1991 [JP] Japan .................... 3-117841

[51] Int. Cl.⁵ .............................................. H01J 9/22
[52] U.S. Cl. ................................. 445/66; 29/281.5; 269/908
[58] Field of Search ................... 445/66, 68, 45; 269/908; 29/281.5

[56] References Cited

U.S. PATENT DOCUMENTS

| | | | |
|---|---|---|---|
| 2,826,870 | 3/1958 | Soubier | 269/908 |
| 4,179,783 | 12/1979 | Inoyama et al. | 29/281.5 |
| 4,820,227 | 4/1989 | Itiki et al. | 445/68 X |
| 4,902,258 | 2/1990 | Dunsmore et al. | 445/66 X |

FOREIGN PATENT DOCUMENTS

| | | |
|---|---|---|
| 0317391 | 5/1989 | European Pat. Off. |
| 3909292 | 10/1989 | Fed. Rep. of Germany |
| 1277576 | 6/1972 | United Kingdom |

*Primary Examiner*—Kenneth J. Ramsey
*Attorney, Agent, or Firm*—Hill, Steadman & Simpson

[57] ABSTRACT

A cathode ray tube positioning apparatus employed in the process steps of the preparation of a cathode ray tube of a television receiver or the like is disclosed. The apparatus is constituted by plural ball castors supporting the front panel surface of the cathode ray tube constituted by a panel and a funnel and roll units supporting the lateral panel sides. When positioning the cathode ray tube, the front panel surface is supported by the ball castors and the tube is moved by the roll units supporting the lateral panel sides. The front panel sides are not grazed because the ball castors are rotated with movement of the cathode ray tube.

4 Claims, 2 Drawing Sheets

CATHODE RAY TUBE POSITIONING DEVICE

BACKGROUND OF THE INVENTION

1. Field of the Invention

This invention relates to a cathode ray tube positioning device employed in a production process for producing a cathode ray tube for e.g. a monochromatic television receiver or a color television receiver.

2. Description of the Prior Art

The cathode ray tube employed in, for example, a color television receiver, is produced through a number of process steps, including the step of coating the inner surface of the panel with carbon or phosphors and producing a phosphor surface by light exposure and development and the step of attaching a shadow mask to the panel provided with the phosphor surface.

For carrying out these process steps, the cathode ray tube needs to be positioned accurately. For example, in the process step of preparing the phosphor surface, the panel needs to be positively secured in position because high precision is required as to the width and the relative position of carbon stripes and phosphor stripes. Above all, in the process step of producing the phosphor surface, a higher accuracy is required as to panel positioning because the operations of light exposure and development need to be performed repeatedly. Even after the phosphor surface is completed, it is necessary to position the panel or the cathode ray tube accurately.

As a conventional cathode ray tube positioning device, there is known a device composed of fastener pins for securing the panel transported by rolls, an abutment roll unit for abutment against an alignment section on the lateral surface of the panel, and a counter roll unit facing the abutment roll unit for positioning and securing the panel in cooperation with the abutment roll unit.

For positioning the cathode ray tube by the above-mentioned positioning device, the panel transported by the rolls or the like is supported by four fastener pins, with a front panel surface as a supporting surface.

In this state, air is ejected against the panel via a center hole of a suction pad intimately contacted with the front panel surface.

The result is that the panel is subjected to a reduced force of friction relative to the fastener pins due to the air directed thereto from the lower side.

The abutment roll unit is abutted against the alignment section on the lateral surface of the panel so that the panel is supported in abutment against the abutment roll unit by the counter roll unit provided facing the abutment roll unit for positioning the panel.

In the above-described device, a small-sized cathode ray tube can be positioned fairly accurately. However, a large-sized cathode ray tube cannot be positioned accurately because of weight. That is, the large-sized cathode ray tube is so heavy that, even when an air blower is used for ejecting air for reducing the force of friction between the stationary pin and the front panel, the counter roll unit needs to be pressed with a larger pressure. The result is that fine positioning of the cathode ray tube is difficult to achieve is that the positioning accuracy of the cathode ray tube is lowered. Although air blowing, for example, may be intensified for combatting this problem, the air blowing noise is increased prohibitively. In the above-described device, the front panel surface tends to be grazed due to contact with the fastener pins to produce flaws. In large-sized cathode ray tube, such flaws tend to be so severe that the production yield may be lowered significantly.

OBJECTS AND SUMMARY OF THE INVENTION

It is therefore an object of the present invention to provide a cathode ray tube positioning device whereby the cathode ray tube may be positioned easily and highly accurately.

It is another object of the present invention to provide a cathode ray tube positioning device whereby the front panel surface may be prevented from being grazed.

The present invention provides a cathode ray tube positioning apparatus comprising ball castor means and roll means for supporting a front panel surface and lateral panel sides of a cathode ray tube, respectively.

With the apparatus of the present invention, since the front panel surface of the cathode ray tube is supported by the ball castors, the cathode ray tube may be moved easily to a predetermined site by a smaller force applied to the roll means supporting the lateral panel sides. Thus, with the use of the present apparatus, the repeated cathode ray tube positioning operations may be achieved for the respective production steps of the cathode ray tube with improved accuracy to enable high quality cathode ray tubes to be produced. Besides, the large-sized cathode ray tubes may be positioned accurately without the risk of grazing the front panel surface.

DESCRIPTION OF THE PREFERRED EMBODIMENT

Figure 1:
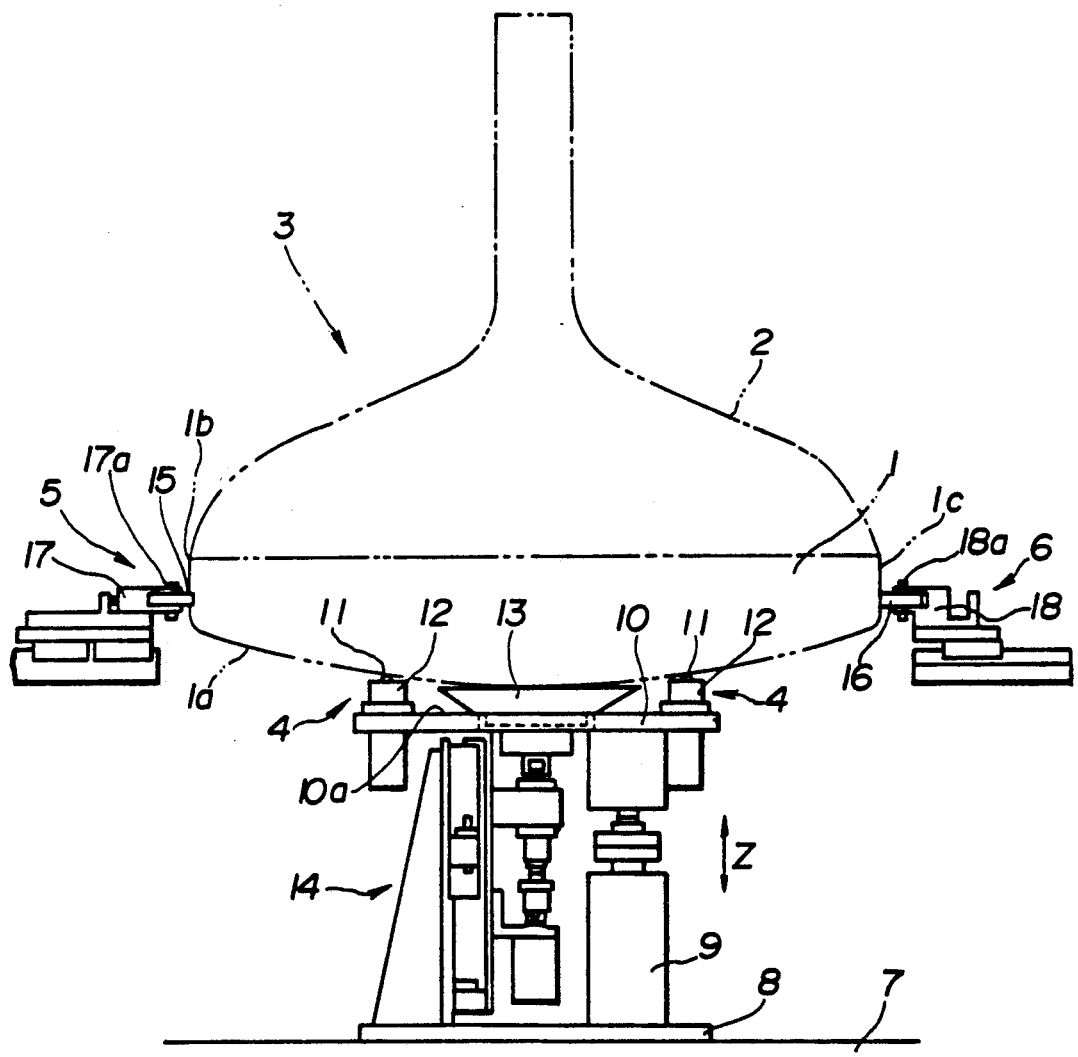
FIG. 1 is a schematic side view showing a cathode ray tube positioning device according to an embodiment of the present invention.

Referring to the drawings, a preferred embodiment of the cathode ray tube positioning device according to the present invention will be explained in detail.

Figure 2:
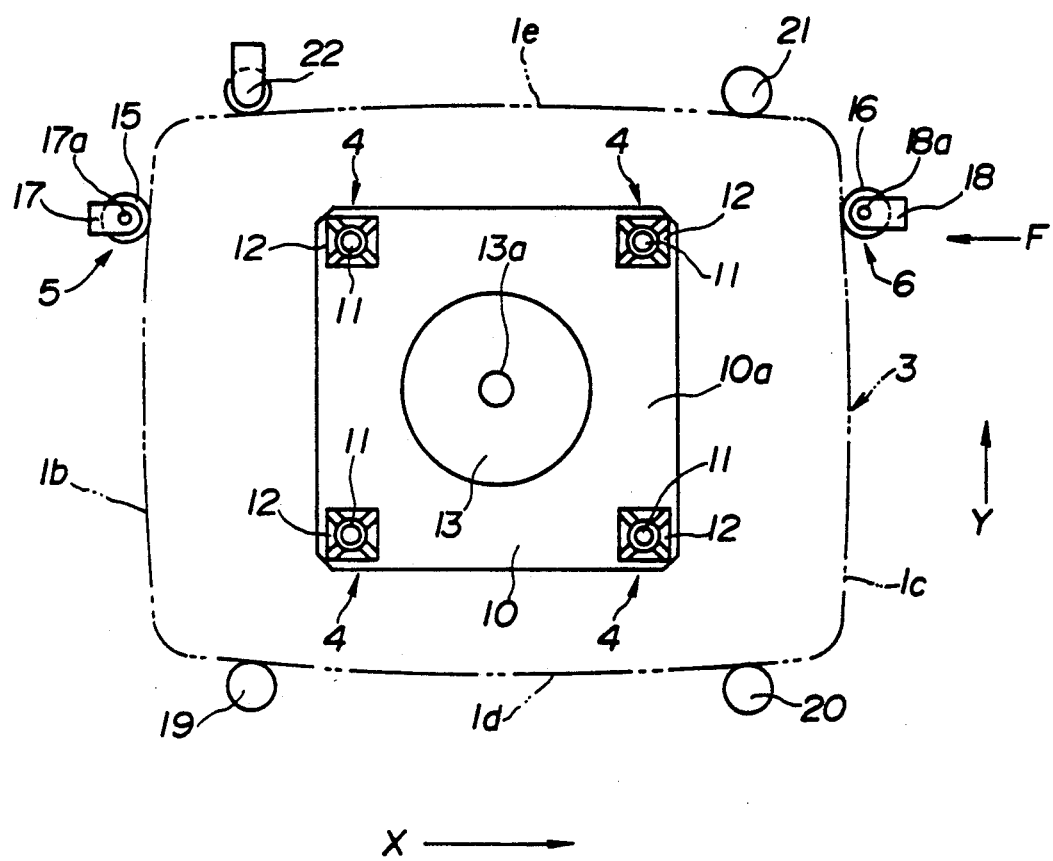
FIG. 2 is a schematic plan view showing the cathode ray tube positioning device shown in FIG. 1.

Referring to FIGS. 1 and 2, the cathode ray positioning device is comprised of a plurality of ball castors 4 for supporting a front panel surface 1a of a cathode ray tube 3 composed of a panel 1 and a funnel 3, an abutment roll assembly 5 and a counter roll assembly 6 for supporting lateral panel sides 1b, 1c of the cathode ray tube 3, respectively.

The ball castors 4 are provided at four corners of a ball castor mounting base plate 10 provided at distal ends of a supporting member 9 provided on a base plate 8 secured to a base block 7. Each ball castor 4 includes a ball 11 supporting a front panel surface 1a and a ball support rest 12 rotatably supporting the ball 11. The ball 11 contacted with the front panel surface 1a is formed of e.g. synthetic resin for not grazing the front panel surface. The ball support rests 12 are passed through and secured at the four corners of the ball castor mounting base plate 10 so that the balls 11 are protruded from a surface 10a of the mounting plate 10 facing the panel 1.

The ball castor mounting base plate 10, provided with the ball castors 4, may be moved vertically in a direction shown by arrow Z in FIG. 1, by the supporting member 9 provided on the base plate 8. The cathode ray tube 3, supported by the ball castors 4, may be adjusted by the supporting member 9 in a direction along the height of the supporting member 9.

An air blowing device 14 provided on the base plate 8 has a suction pad 13 passed through a central opening, not shown, at the center of the ball castor mounting base plate 10, for being projected at the surface 10a facing the panel 1 of the ball castor mounting base plate 10. The air blowing device 14 is mounted on the base plate 8 and is adapted for ejecting an air current towards the panel 1 via an air ejecting opening 13a provided centrally of the suction pad 13. The suction pad is frustoconical in shape and formed of e.g. rubber and has a function of securing the panel by being sucked against the front panel surface 1a when the cathode ray tube 3 is mounted in position by the abutment roll assembly 5 and the counter roll assembly 6.

The abutment roll assembly 5 and the counter roll assembly 6 are provided facing a lateral panel surface 1b and the other opposite lateral panel surface 1c, respectively. The abutment roll assembly 5 is comprised of a roll 15 contacted with the lateral panel surface 1b and a roll supporting member 17 for rotatably supporting the roll 15. The counter roll assembly 6 is comprised of a roll 16 contacted with the lateral panel surface 1c and a roll supporting member 18 for rotatably supporting the roll 16. The rolls 15 and 16, contacted with the panel sides 1b, 1c, respectively, are formed of e.g. synthetic resin or rubber for not damaging the panel 1. The rolls 15, 16 are mounted on roll supporting pins 17a, 18a, provided on the roll supporting members 17, 18, respectively, for being rotated relative to these roll supporting pins 17a, 18a, respectively.

When the cathode ray tube 3 is supported by the ball castors 4, the above described abutment roll assembly 5 is contacted with the alignment section of the panel 1. On the other hand, when the abutment roll assembly 5 is contacted with the panel 1, the counter roll assembly 6 is advanced towards the panel 1 for being resiliently pressed against the lateral panel surface 1c of the panel 1 with a predetermined force F. Thus the position of the cathode ray tube 3 in the direction shown by an arrow X in FIG. 2 (X-direction) is set by the abutment roll assembly 5 and the counter roll assembly 6.

Meanwhile, the position of the cathode ray tube 3 in the direction shown by arrow Y in FIG. 2 (Y-direction) is set by positioning pins 19, 20 and 21 and a positioning roll 22 adapted for being contacted with the remaining lateral panel sides 1d, 1e for regulating the position of the cathode ray tube 3 in the above-mentioned Y-direction.

In operation, the cathode ray tube 3 transported by rolls etc, not shown, through a series of upstream production steps is regulated as to its position in the Y-direction shown in FIG. 2 by the positioning pins 19 to 21 and the positioning roll 22.

The ball castors 4, provided below the ball castors 4, are raised towards the cathode ray tube 3 by the supporting member 9 until the cathode ray tube 3 is supported by the ball castors 4.

That is, the balls 11 of the ball castors 4 are contacted with a point contact with the front panel surface 1a of the cathode ray tube 3 for supporting the cathode ray tube 3.

Air is then ejected towards the front panel surface 1a via air ejection opening 13a of the suction pad 13 provided facing the front panel surface 1a by way of air blowing.

The abutment roll assembly 5 is abutted against the alignment section of the lateral panel surface 1b, while the counter roll assembly 6 is advanced and resiliently pressed against the lateral panel surface 1c for shifting the cathode ray tube 3 to a predetermined position.

By this air blowing, and by the support of the cathode ray tube 3 by the ball castors 4, it suffices to apply a smaller force to the counter roll assembly 6 to shift the cathode ray tube 3 to a predetermined position. In this manner, the cathode ray tube 3 may be positioned finely and accurately. Even a large-sized cathode ray tube 3 can be moved easily to a predetermined position with a smaller force. The front panel surface 1a is not grazed because the front panel surface 1a is not rubbed against the balls 11 during movement of the cathode ray tube 3. In positioning the large-sized cathode ray tube 3 by the conventional system, the cathode ray tube 3 cannot be moved without difficulty unless extensive air blowing is used. According to the present invention, the cathode ray tube can be moved easily without increasing an output of the air blowing system. The result is the diminished air blowing noise.

The cathode ray tube 3 thus positioned is fixed in position with the suction pad 13 sucked to the front panel surface 1a.

Meanwhile, when the cathode ray tube is positioned in this manner, air blowing is discontinued.

In this state, predetermined operations may be carried out on the cathode ray tube 3. Above all, in the step of forming a phosphor surface on the inner side of the panel 1, the cathode ray tube needs to be set in position for each of the light exposure and developing operations which are carried out repeatedly. According to the present invention, accurate positioning may be achieved no matter to which process step the cathode ray tube is transported. Thus, with the use of the present apparatus, the cathode ray tube 3 with high quality may be produced.

What is claimed is:

1. A cathode ray tube positioning apparatus comprising ball castor means and roll means for supporting a front panel surface and lateral panel sides of a cathode ray tube, respectively.

2. A cathode ray tube positioning apparatus as claimed in claim 1 wherein balls of said ball castors are formed of synthetic resin and rolls of said roll means are formed of synthetic resin or rubber.

3. A cathode ray tube positioning apparatus as claimed in claim 1 further comprising suction means provided facing said panel surface for being sucked against a panel of said cathode ray tube.

4. A cathode ray tube positioning apparatus as claimed in claim 1 wherein said ball castors are mounted on a vertically movable supporting base, wherein the height position of said cathode ray tube is adjusted by said supporting base.

* * * * *